(12) United States Patent
Allmann

(10) Patent No.: US 8,091,957 B2
(45) Date of Patent: Jan. 10, 2012

(54) PIVOTABLE VEHICLE SEAT

(75) Inventor: Christian Allmann, Vienna (AT)

(73) Assignee: MAN Nutzfahrzeuge Osterreich AG (AT)

( * ) Notice: Subject to any disclaimer, the term of this patent is extended or adjusted under 35 U.S.C. 154(b) by 0 days.

(21) Appl. No.: 11/683,177

(22) Filed: Mar. 7, 2007

(65) Prior Publication Data

US 2007/0273182 A1 Nov. 29, 2007

(30) Foreign Application Priority Data

Mar. 7, 2006 (AT) .................................. A 376/2006

(51) Int. Cl.
*A47C 13/00* (2006.01)
*A47C 7/62* (2006.01)
(52) U.S. Cl. ..................................... 297/129; 297/188.1
(58) Field of Classification Search .................... 297/13, 297/119, 122, 123, 129, 130, 144, 188.08, 297/188.09, 188.1, 331, 344.14, 344.21, 297/188.2, 337, 313, 1, 2, 3, 118, 283.1
See application file for complete search history.

(56) References Cited

U.S. PATENT DOCUMENTS

| | | | | |
|---|---|---|---|---|
| 912,781 A * | 2/1909 | Barrett et al. | ............... | 297/283.1 |
| 2,466,081 A * | 4/1949 | Colvez | ............. | 297/93 |
| 3,516,098 A * | 6/1970 | O'Link | ......... | 441/127 |
| 3,667,803 A * | 6/1972 | Ford | ............. | 297/119 |
| 5,562,331 A * | 10/1996 | Spykerman et al. | ..... | 297/188.16 |
| 5,927,800 A * | 7/1999 | Stallworth | ............... | 297/188.08 |
| 6,102,463 A * | 8/2000 | Swanson et al. | ........... | 296/37.15 |
| 6,113,182 A * | 9/2000 | Wise | ............. | 297/119 |
| 6,488,327 B1 * | 12/2002 | Pearse et al. | ................ | 296/65.05 |
| 6,869,121 B2 * | 3/2005 | Kayumi et al. | ............ | 296/37.15 |
| 6,932,424 B2 | 8/2005 | Rhodes et al. | | |
| 6,962,384 B2 | 11/2005 | Rhodes et al. | | |
| 7,093,899 B2 * | 8/2006 | Fisher et al. | ................ | 297/334 |
| 2005/0189464 A1 | 9/2005 | Link | | |

FOREIGN PATENT DOCUMENTS

| | | |
|---|---|---|
| DE | 37 05 059 | 8/1988 |
| DE | 41 14 554 | 5/1992 |
| DE | 91 12 213 | 6/1992 |
| DE | 102 19 772 | 11/2003 |
| DE | 103 42 345 | 4/2005 |
| FR | 2 721 869 | 5/1996 |
| FR | 2 847 860 | 4/2004 |

* cited by examiner

*Primary Examiner* — Milton Nelson, Jr.

(74) *Attorney, Agent, or Firm* — Robert Becker; Robert Becker & Assoc.

(57) ABSTRACT

A seat comprising a component that is cushioned on one side and is disposed on a seat base. A pivot/rotation mechanism is operatively connected to the seat base and the component for displacing the component, in a positively guided manner, in a position into which the cushion side faces downwardly, and in which at least one further auxiliary utility is accessible.

11 Claims, 4 Drawing Sheets

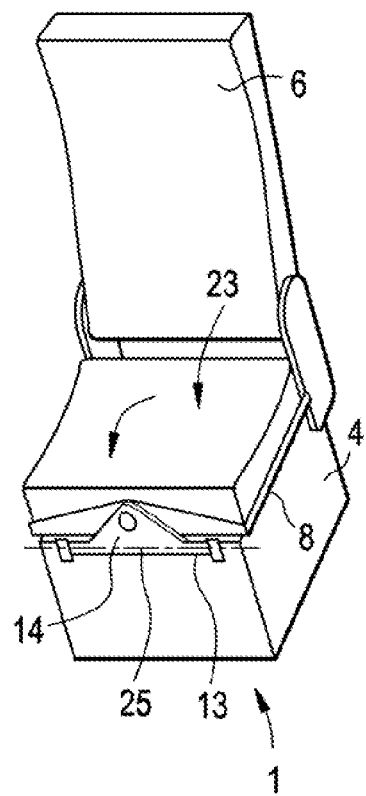
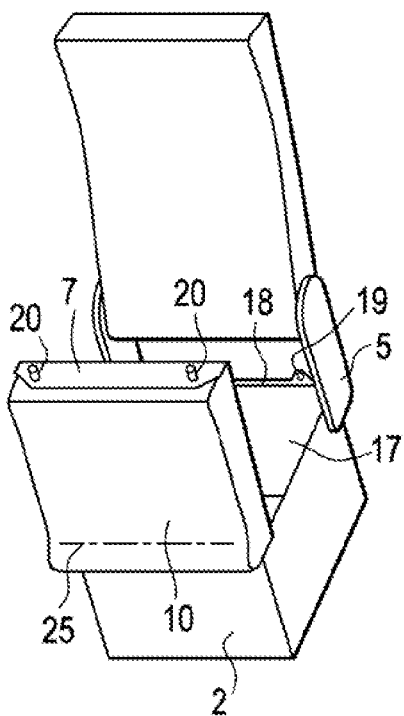
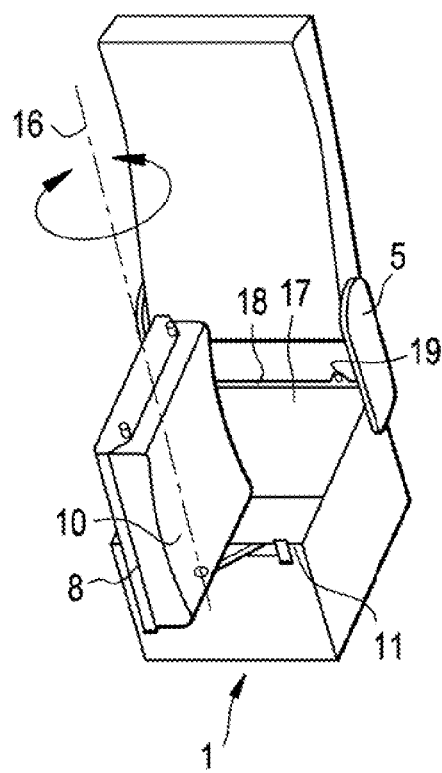

FIG. 1D
FIG. 1E
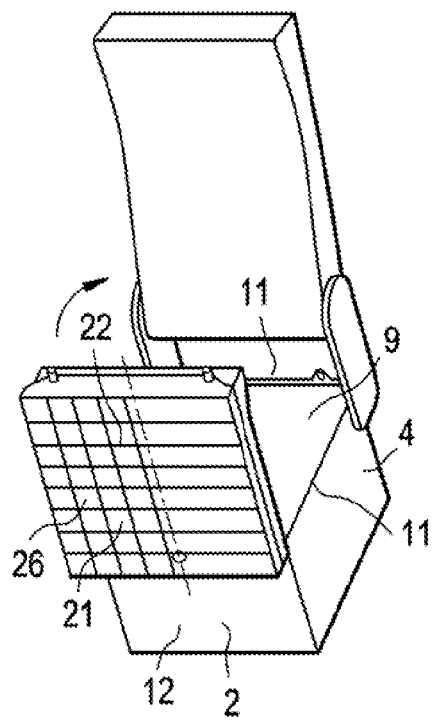
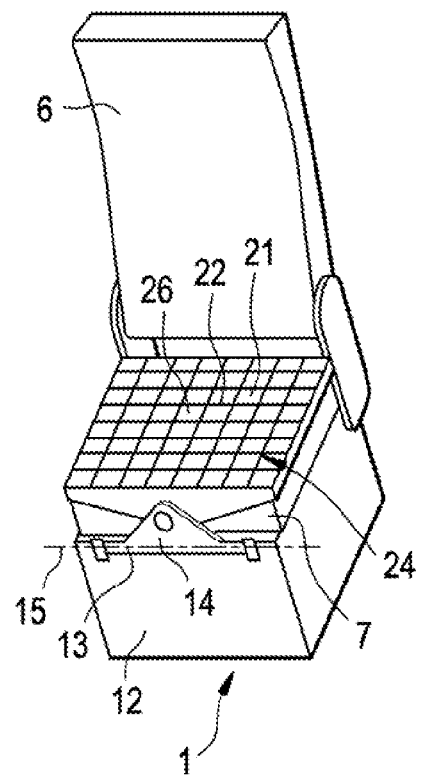

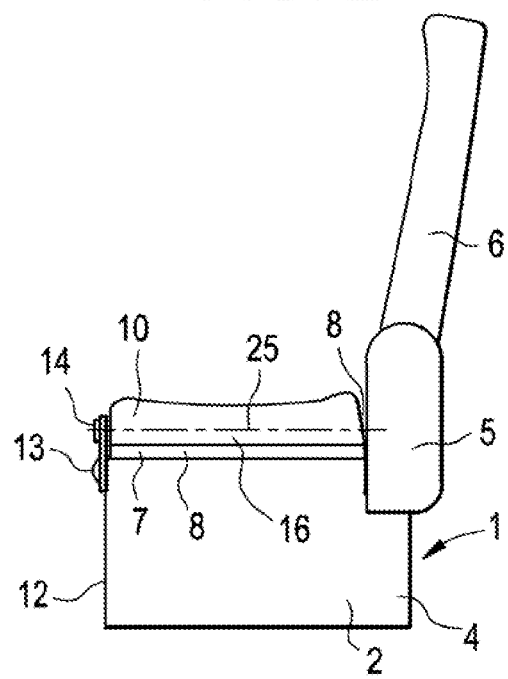
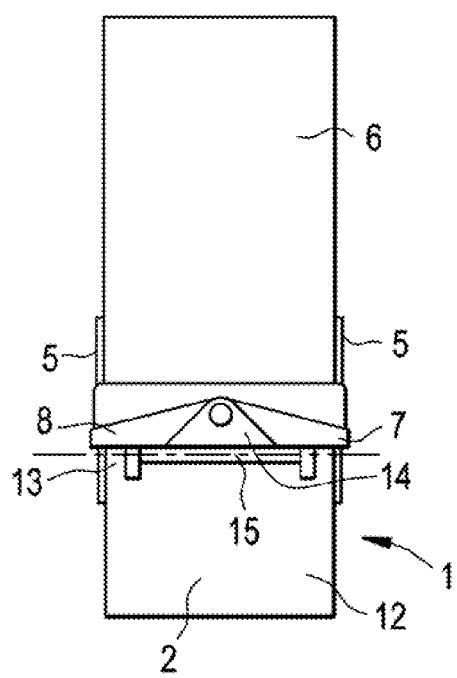
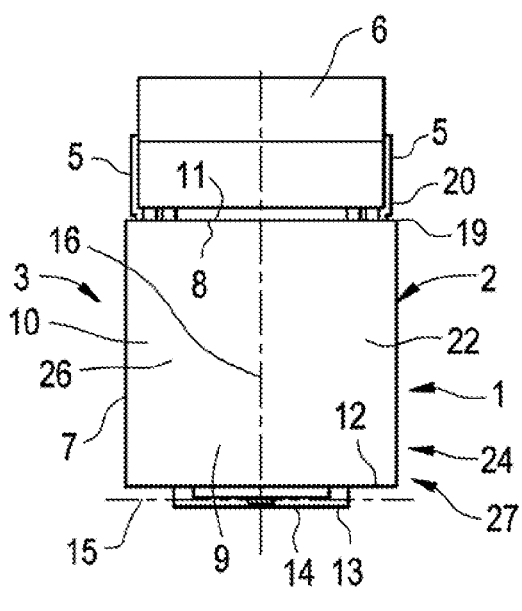

PIVOTABLE VEHICLE SEAT

The instant application should be granted the priority date of Mar. 7, 2006 the filing date of the corresponding Austrian patent application A376/2006.

BACKGROUND OF THE INVENTION

The present invention relates to a seat that is cushioned on the upper side, especially a seat for a truck.

DE 37 050 59 A1 discloses a motor vehicle seat with a backrest that can be folded forwardly onto the seating portion. Pivotably mounted on the back side in an upper region of the backrest is a plate-shaped wall portion on which a further plateshaped wall portion is held so as to be pivotable about a pivot axis that is parallel thereto. Both wall portions can be connected to the back side of the backrest in such a way that they can be folded against one another, and then, with the backrest folded toward the front: form a planar support surface for luggage. Furthermore, both wall portions can together be folded up, relative to the folded-down backrest, into an upright position and fixed, so that an upwardly open receptacle for baggage results that when the second wall portion is pivoted away from the first wall portion, and latching via the latching mechanism, the backrest can still be closed, whereby the second wall portion forms the container cover. This manner of construction has proved useful in the past for providing a support surface or an open receptacle for baggage in the interior of the driver cabin.

It is an object of the present invention to provide a seat having a stationary backrest in the driver cabin of a commercial vehicle, the seating surface of which is accessible not only for sitting but also for a number of other purposes.

BRIEF DESCRIPTION OF THE DRAWINGS

This object, and other objects and advantages of the present invention, will appear more clearly from the following specification in conjunction with the accompanying schematic, drawings, in which:

FIGS. 1a to 1e show the sequence of the pivoting and rotational movements of the sitting surface in accordance with the present invention;

FIG. 2 is a side view of the seat;

FIG. 3 is a front view of the seat; and

FIG. 4 is a plan view of the seat; and

SUMMARY OF THE INVENTION

Figure 5:
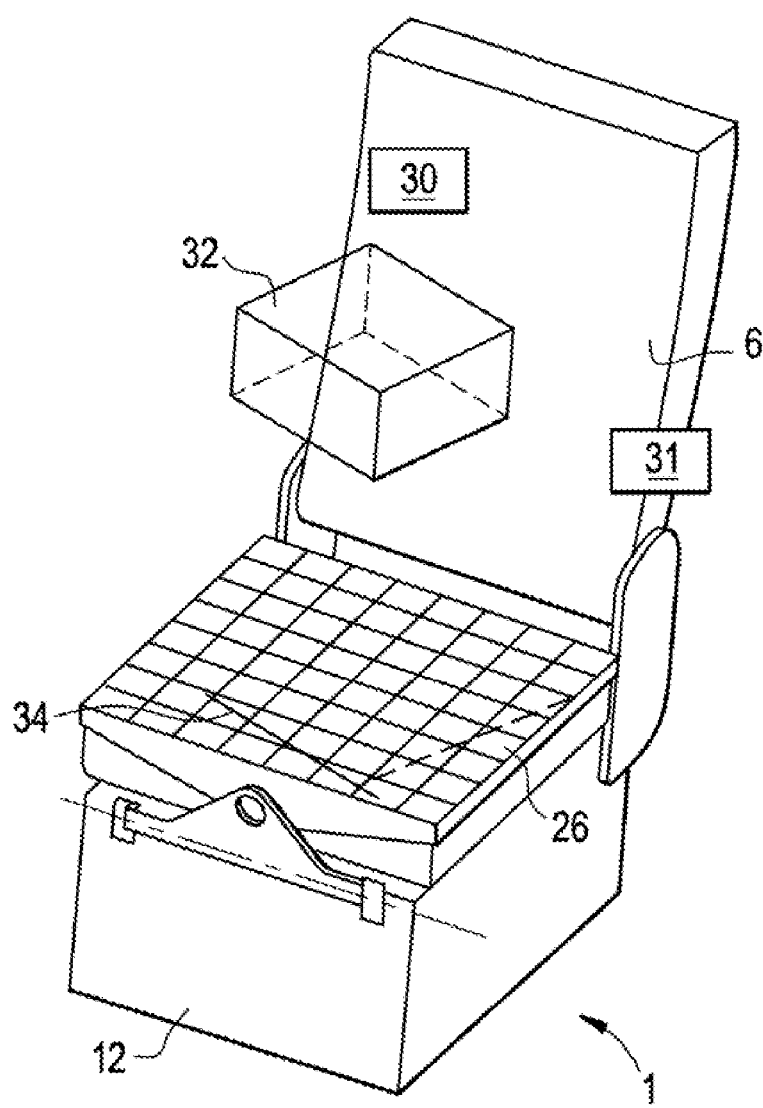
FIG. 5 is a plan view of the seat showing a mechanism for detachable securement of objects on the seat as well as a mechanism for supporting on-board equipment.

The seat of the present application is provided with a seating surface or component that rests on a seat base and can be displaced. In a positively guided manner, by a pivot/rotation mechanism into a position in which the upper side of the component faces downwardly and in which at least one further auxiliary utility is accessible.

The present invention has the advantage that the seating surface or component, which is cushioned or upholstered on the upper side, can be converted by the inventive pivot/rotation mechanism into a predominantly planar surface that can be stepped upon and/or that can be used as a support surface, for example for electrical on-board equipment, such as, for example, personal computers electronic communication means, or the like. The electrical on-board equipment are attached to the support surface so as to be releasable yet secure against being lost. In conjunction with the support surface, and with the aid of the pivot/rotation mechanism, the equipment can be displaced into a starting position of the seat such that the equipment faces the roadway, and extends into at least one opening in the seat base, and the cushioning of the seat faces the roof of the vehicle cabin. The starting position of the seat means the position in which the seat rests upon the seat base in a position that is approximately parallel to the roadway, with its cushion or upholstery facing the roof of the driver cabin and its back side facing the floor of the vehicle.

Pursuant to one embodiment of the invention, the seat can be pivotable by means of a hinge, which extends along the upper edge of the front side of the seat, out of a starting position that is disposed parallel to the roadway. The sitting surface can easily and with little expenditure of energy be pivoted out of its starting position on the seat base with the aid of the hinge.

Pursuant to one embodiment of the invention, after pivoting out of the starting position by approximately 90°, the seat can be rotatable about an axis of rotation that extends perpendicular to the hinge and approximately through the center thereof.

Pursuant to another embodiment of the invention, the axis of rotation that extends through the hinge can be connected therewith.

Pursuant to an embodiment of the invention, the seat, in a position rotated relative to the starting position by 180° about the axis of rotation, can be pivoted forwardly in a direction toward the seat base and into a position corresponding to the starting position.

Pursuant to another embodiment of the invention, the back side of the seat can be stepped upon.

Pursuant to an embodiment of the invention, the seat can be braced to ensure that it can be stepped upon.

Pursuant to another embodiment of the invention the back side of the seat can be provided with a coating or covering that can be safely stepped on.

Pursuant to one embodiment of the invention the back side of the seat can be provided with a structured support surface to receive objects thereon.

Pursuant to another embodiment of the invention, the support surface can be provided with mechanisms for the detachable securement of the placed-on objects.

Pursuant to an embodiment of the inventions, the back side of the seat can be provided with receiving mechanisms for holding on-board equipment in such a way that it cannot be lost. It is also conceivable to provide holding means for paper and boxes or to clip on-board tools on the back side.

Pursuant to another embodiment of the invention, the seat can be provided with an arresting means for a detachable anchoring relative to the seat base, with the arresting means being disposed on the side of the seat base that is opposite the hinge.

Further specific features of the present application will be described in detail subsequently.

DESCRIPTION OF SPECIFIC EMBODIMENTS

Referring now to the drawings in detail, FIG. 1 shows the seat of the commercial vehicle in various positions. In FIG. 1a, the seat 1 has a seat base 2, on the end 4 of the side walls 3 of which, which end 4 faces the rear wall of the driver cabin (not shown), disposed on the seat base 2, with the aid of two oppositely disposed side plates 5, is a backrest 6. The seat 1 includes the receiving box 7 with its borders or skirting 8 and the seat cushion 10, which is disposed within the borders 8.

The receiving box 7, with its borders 8, rests upon the seat base 2 and accommodates the seat cushion 10. Extending along the upper edge 11 on the front side 12 of the seat base 2 is a hinge 13, which is connected via a tongue 14 with the receiving box 7. The receiving box 7 of the seat 1, in conjunction with the hinge 13, is pivotably mounted about the axis 15. It is also conceivable that the hinge alternatively be disposed along the upper edge of one of the two sides of the seat base 2. The pivoting and/or rotational movement of the receiving box 7 with its seat cushion 10 can be carried out manually, or also, for example, by a motor.

FIG. 1b shows the seat 1 of FIG. 1a. Here, however, the receiving box 7, with the seat cushion 10 that is disposed therein, has been pivoted up or out via the hinge 13, about the axis 15, by an angle of about 90° relative to the starting position 23 (see FIG. 1a) in a direction toward the roof of the driver cabin (not shown). Provided on the upper edge 18 of the rearward side wall 17 of the seat base 2 are arresting means 19 that are adapted to receive pins 20 disposed on the rearward border 8 of the receiving box 7. The pins 20 are adapted to be releasably received in the arresting means 19.

FIG. 1c shows the seat 1 of FIG. 1b. The receiving box 7, which is connected to the tongue 14 and accommodates the seat cushion 10, is rotated in a counterclockwise direction by 90.degree. about the pivot or rotation axis 16, which extends approximately perpendicularly through the hinge 13. The tongue 14, which is connected to the hinge 13, faces away from the backrest 6 and carries the pivot axis 16.

FIG. 1d shows the seat 1 of FIG. 1c. The receiving box 7, and along with it the seat cushion 10, are rotated about the pivot axis 16, in a counterclockwise direction, by a further 90° relative to the position of FIG. 1c. The seat cushion 10 that is disposed in the receiving box 7 now faces the backrest 6. As can be clearly seen, disposed on the back side 21 of the receiving box 7 is a coating or covering 22 that is sturdy enough to safely step on.

FIG. 1e shows the seat 1 of FIG. 1d. The receiving box 7, which is connected to the tongue 14 of the hinge 13, is pivoted forwardly, in the direction toward the seat base 2, about the axis 15 that extends through the hinge 13, into a position rotated about the pivot axis 16 by 180° relative to the starting position 23. The receiving box 7 rests upon the upper edge 11 of the seat base 2. In this connection, the pins 20 catch in the arresting means 19.

FIG. 2 shows a side view of the seat 1. One of the side plates 5 can be seen on the rear end 4 of the seat base 2 that faces the rear wall of the cabin housing (not shown); the side plates 5 establish the connection of the seat base 2 with the backrest 6. The seat base 2 is closed off toward the top by the receiving box 7. The seat cushion 10, which is disposed in the receiving box 7, faces the roof of the cabin housing (not shown) of the commercial vehicle. The hinge 13 and the tongue 14 can be seen on the front side 12 of the seat face 2 that faces away from the backrest 6. Disposed on the tongue 14 is the pivot axis 16, which extends through the border 8 of the receiving box 7 and is connected with the border 8 of the receiving box 7 that is opposite the hinge 13. The course of the pivot axis 16 is illustrated by the dot-dash line 25.

FIG. 3 shows the front view of the seat 1. The seat base 2 is connected by the side plates 5 with the backrest 6, and is closed off by the receiving box 7. Shown on the front side 12 of the seat base 2 is the hinge 13, which is connected with the tongue 14. The border or skirting of the receiving box 7 is indicated by the reference numeral 8. The axis that extends through the hinge 13 is indicated by the dot-dash line 15.

FIG. 4 is a plan view of the inventive seat 1. The seat base 2 is connected to the backrest 6 via the side plates 5. The receiving box 7 rests upon the seat base 2, so that the pins 20 catch or engage in the arresting means 19. On the front side 12 of the seat base 2 facing away from the backrest 6 one can recognize the hinge 13. The axis 15 extends through the hinge 13. The pivot axis 16 extends approximately perpendicular relative to the hinge 13. The seat cushion 10 is disposed in the receiving box 7 in such a way that it cannot slip therein, yet is removable from the receiving box 7. The seat cushion 10 offers to the user of the seat 1 of the commercial vehicle a comfortable and secure seat for long periods of travel, yet can also be removed, for example for repair purposes. To carry out the pivot and rotational movements within the context of the present invention, the seat cushion 10 is disposed in the receiving box 7 in such a way that it cannot be lost.

The pivot/rotation mechanism can be operated during driving, for example by a person. If necessary, the use of the seat base 2 can be made possible in various heights. The seat base 2 can, for example, take on the form of a pedestal that, below the seat 1, in the interior of the seat base 2, offers an additional storage space 9. The storage space is closed off toward the top by the seat 1, regardless of whether the back side of the seat 1 is used as a seating surface, a support surface 26, or a standing surface. It is conceivable that, depending upon the height of the driver cabin, to design the seat base 2 to have a variable height. The seat 1 is selectively convertible into a sitting opportunity that corresponds to the respective leg length of the user. However, the seat 1 can selectively also be usable as a step 24 that is provided with a covering 22 that can be stepped on, and that makes it possible, for example, to pass to the roof of the driver cabin via an opening in the roof. As needed, the seat 1 and seat base 2 can be anchored to the floor of the driver cabin in a stationary or detachable manner.

The receiving box 7 of the seat 1 is provided on its back side 21 with a covering 22 that can be safely stepped on. This ensures that a passenger or the like that steps on the coating 22 has a reliable support even where unwanted material such as dirt, snow, or ice, is present.

The effect of the axis 15 that extends through the hinge 13 is that the receiving box 7 has a stable position in all of its pivot and rotational positions, and does not have to be removed from its support that is provided by the tongue 14. Therefore, it is not necessary to loosen or remove the receiving box 7 from the seat base 2 for a temporary intermediate positioning.

The border or skirting 8 of the receiving box 7 opposite the hinge 13 is provided with an arresting means 19 such that the receiving box is detachable relative to the seat base 2. The arresting means 19 can be disposed on any of the upper edges 11 of the side walls 3 of the seat base 2, and effects a secure and reliable anchoring of the receiving box 7 not only for the use of the seat cushion 10 by the passenger, but also for the back side 21 of the receiving box 7 as a support surface for the passenger or any desired object that will not tip over.

FIG. 5 schematically shows an example of a mechanism 30 that can be used to detachably secure an object 32 to the support surface 26 of the seat 1. Also schematically shown in FIG. 5 is a mechanism 31 for a detachable securement of objects. FIG. 5 further shows a receiving mechanism 34 for supporting on-board equipment so that the equipment cannot be dislodged and/or lost.

The specification incorporates by reference the disclosure of Austrian priority document A376/2006 filed Mar. 7, 2006.

The present invention is, of course, in no way restricted to the specific disclosure of the specification and drawings, but also encompasses any modifications within the scope of the appended claims.

What I claim is:

1. A seat for a vehicle, comprising:
a seat base (2);
a receiving box (7) having a cushioned side that accommodates a seat cushion (10) and is disposed on said seat base (2); and
a pivot/rotation mechanism operatively connected to said seat base (2) and said receiving box (7) for displacing said receiving box (7), in a positively guided manner, into a position in which the cushioned side faces downwardly, and in which at least one further auxiliary utility is accessible, wherein the receiving box (7) is attached to a hinge (13) that extends along an upper edge (11) of a front side (12) of said seat base (2), wherein said receiving box (7) is pivotably mounted about a first axis (15) running along the upper edge (11) through the hinge (13) and after pivoting out from a starting position (23), said receiving box (7) is rotatably mounted about an axis of rotation (16) running perpendicular to the first axis (15), wherein the receiving box (7) is convertible by the pivot/rotation mechanism into a substantially planar surface with a back side (21) of the receiving box (7) being configured to be stepped upon and/or used as a support surface for on-board equipment, wherein the receiving box (7) further has devices for releasable attachment of on-board equipment placed on said support surface of the receiving box (7), wherein the devices are configured for attaching said on-board equipment to the support surface so as to be releasable yet secure against loss, wherein the on-board equipment is displaceable via the support surface and the pivot/rotation mechanism into a starting position of the receiving box (7) such that the on-board equipment faces a roadway on which said vehicle travels and extends into at least one opening in the seat base (2), and wherein the seat base (2) is variably adjustable depending on a height of a driver cabin of said vehicle.

2. A seat according to claim 1, wherein means for arresting (19) is provided for a detachable anchoring of said receiving box (7) relative to said seat base (2), and wherein said means for arresting (19) is disposed on a side of said seat base (2) that is disposed opposite said hinge.

3. A seat according to claim 1, wherein after a pivoting of said receiving box (7) out of said starting position (23) by approximately 90°, said receiving box (7) is adapted to be rotated about the axis of rotation (16) that extends perpendicular to said hinge (13) and approximately through a center thereof.

4. A seat according to claim 3, wherein said axis of rotation (16) that extends through said hinge (13) is connected therewith.

5. A seat according to claim 3, wherein said receiving box (7), in a position rotated relative to said starting position (23) by 180° about said axis of rotation (16), is adapted to be pivoted in a direction toward said seat base (2) and into a position where said receiving box is again disposed on said seat base.

6. A seat according to claim 1, wherein back side (21) is opposite said cushioned side.

7. A seat according to claim 6, wherein at least one of said seat base (2) and said receiving box (7) is provided with means for bracing to ensure that said receiving box (7) can be stepped upon.

8. A seat according to claim 6, wherein said back side (21) of said receiving box (7) is provided with a covering (22) that can be safely stepped upon.

9. A seat according to claim 6, wherein said back side (21) of said receiving box (7) is provided with a structured support surface (26) that is adapted to receive objects thereon.

10. A seat according to claim 9, wherein said support surface (26) is provided with mechanisms for a detachable securement of objects placed thereon.

11. A seat according to claim 6, wherein said back side (21) of said receiving box (7) is provided with receiving mechanisms for supporting on-board equipment in such a way that said on-board equipment cannot be lost.

* * * * *